Sept. 3, 1968  J. M. GOUGET  3,399,945
PROPELLING PENCIL WITH AN INCORPORATED SHARPENING DEVICE
Filed July 28, 1966  12 Sheets-Sheet 1

Sept. 3, 1968  J. M. GOUGET  3,399,945
PROPELLING PENCIL WITH AN INCORPORATED SHARPENING DEVICE
Filed July 28, 1966  12 Sheets-Sheet 2

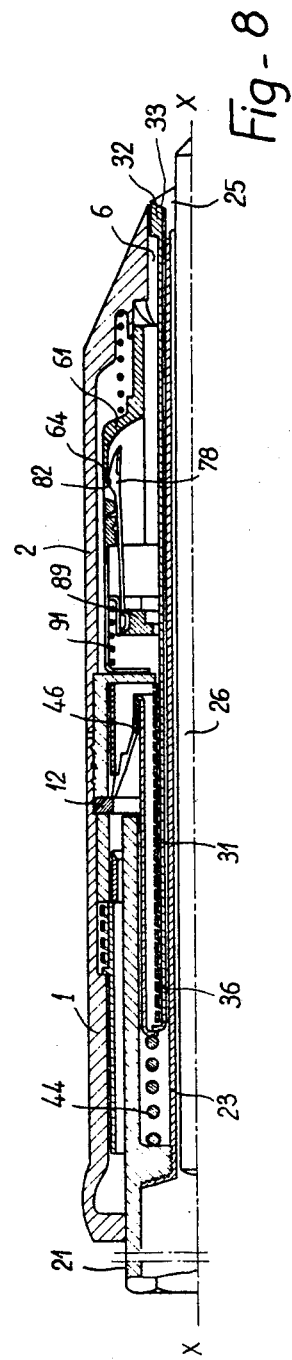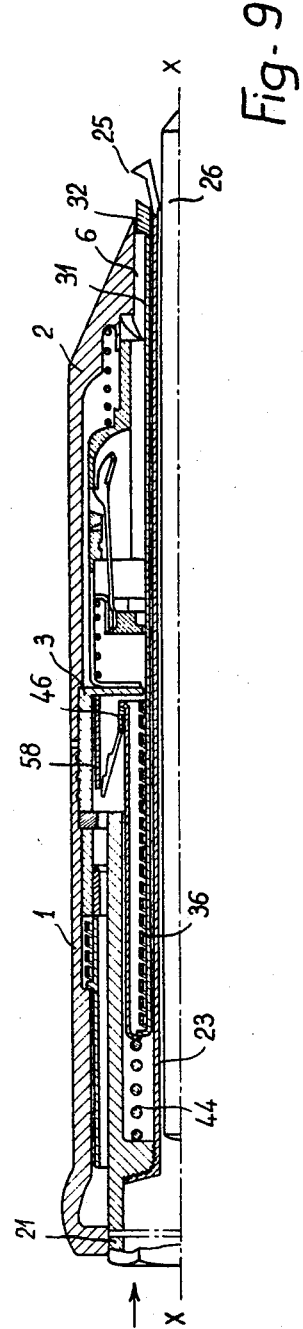

Sept. 3, 1968 J. M. GOUGET 3,399,945
PROPELLING PENCIL WITH AN INCORPORATED SHARPENING DEVICE
Filed July 28, 1966 12 Sheets-Sheet 4
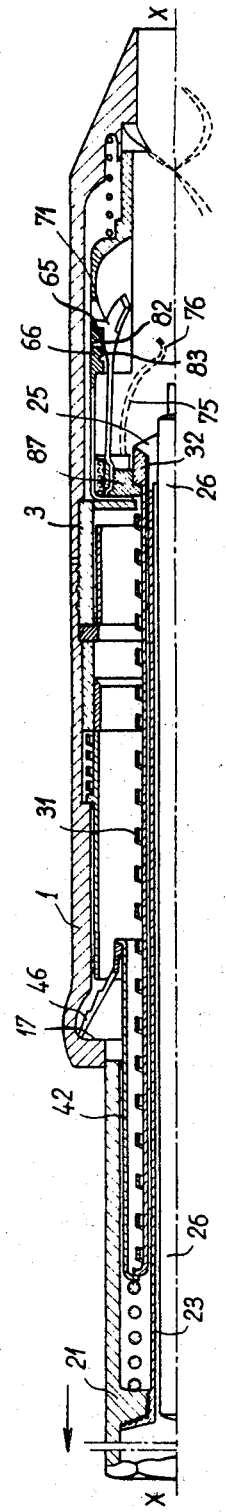
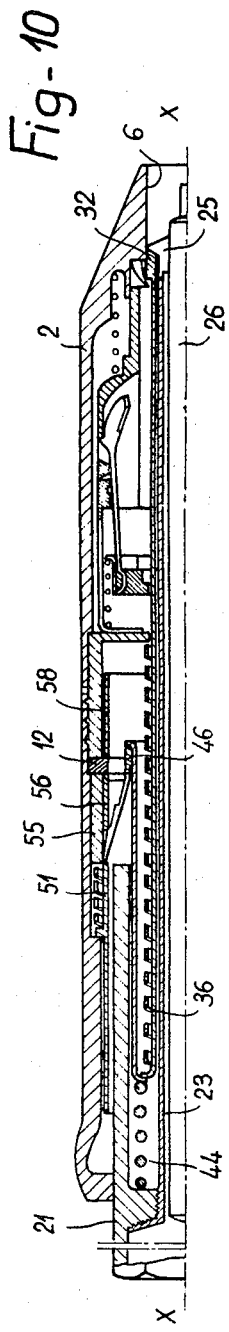

Sept. 3, 1968  J. M. GOUGET  3,399,945
PROPELLING PENCIL WITH AN INCORPORATED SHARPENING DEVICE
Filed July 28, 1966  12 Sheets-Sheet 5
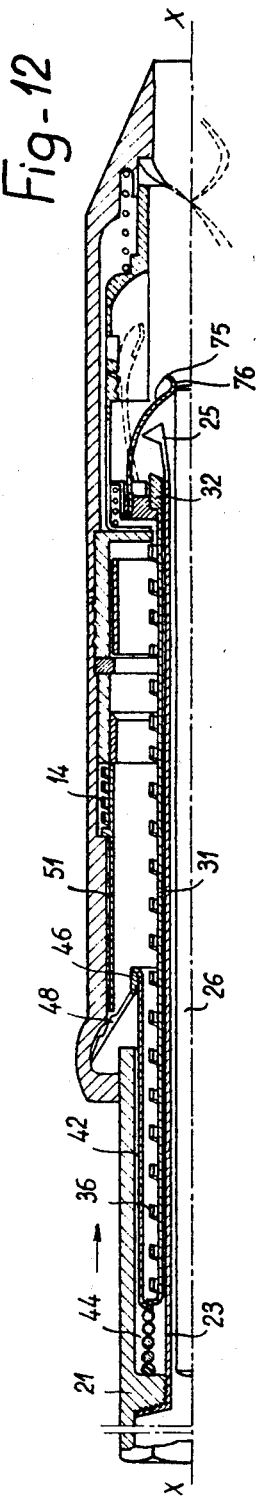
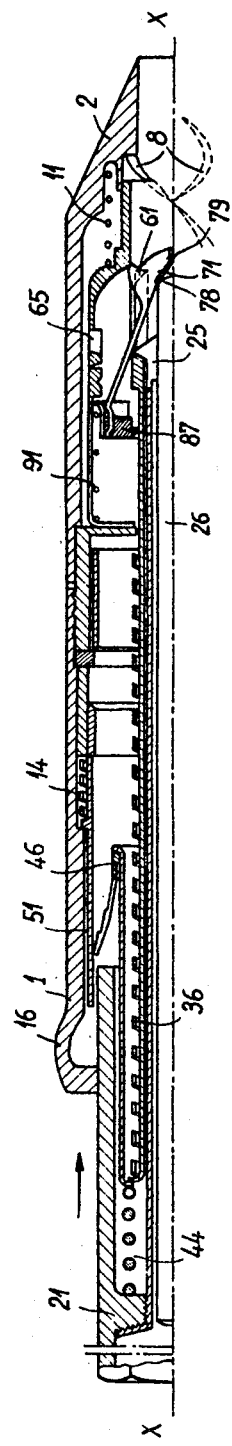

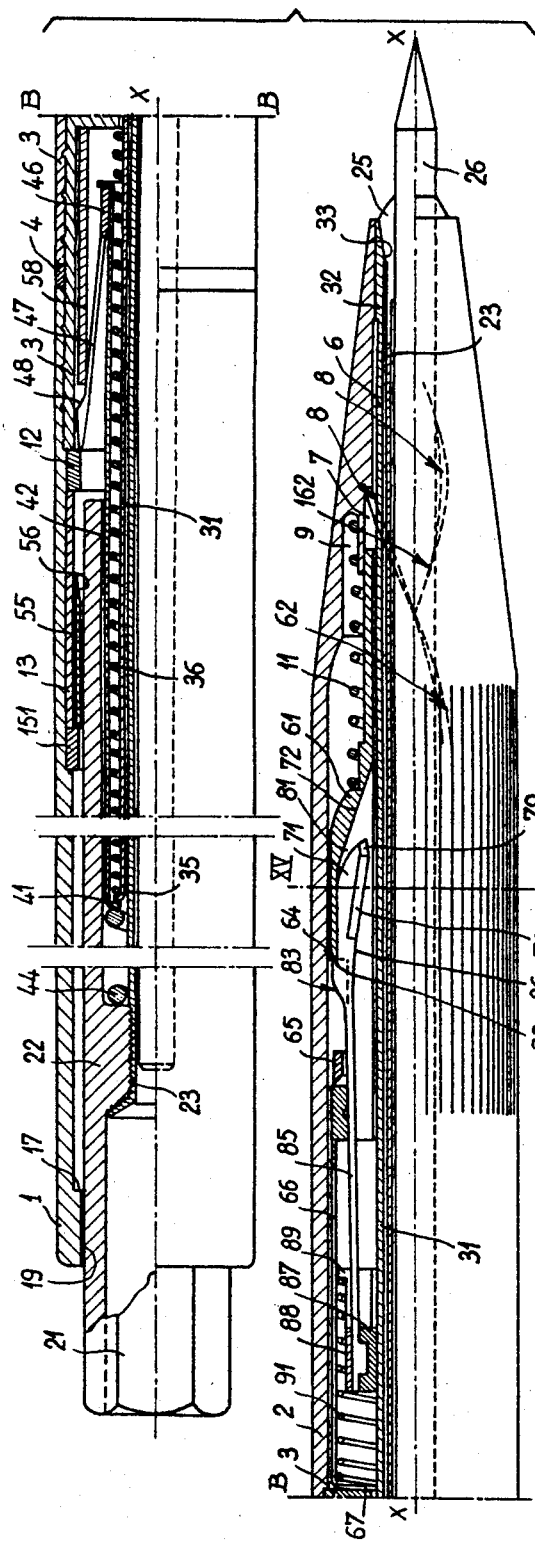

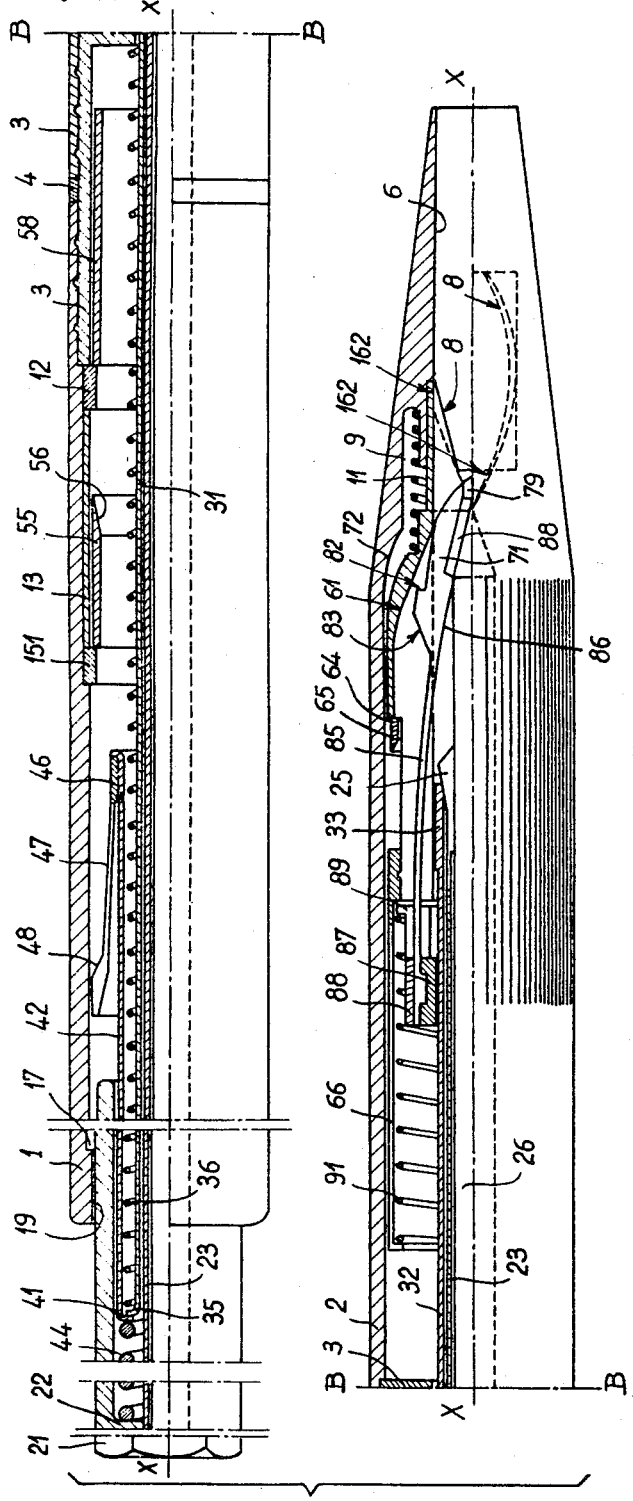

Sept. 3, 1968    J. M. GOUGET    3,399,945
PROPELLING PENCIL WITH AN INCORPORATED SHARPENING DEVICE
Filed July 28, 1966    12 Sheets-Sheet 8
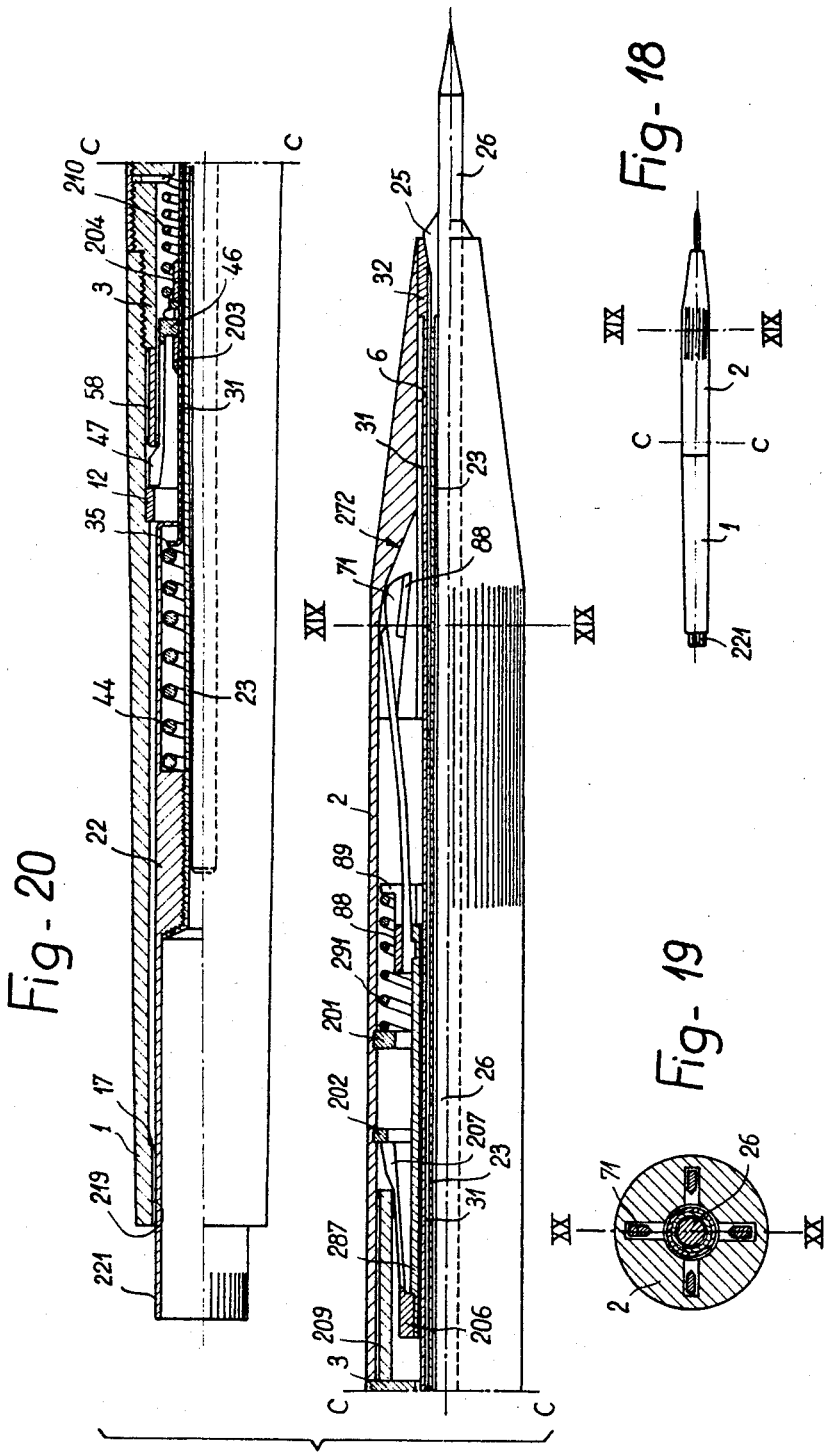

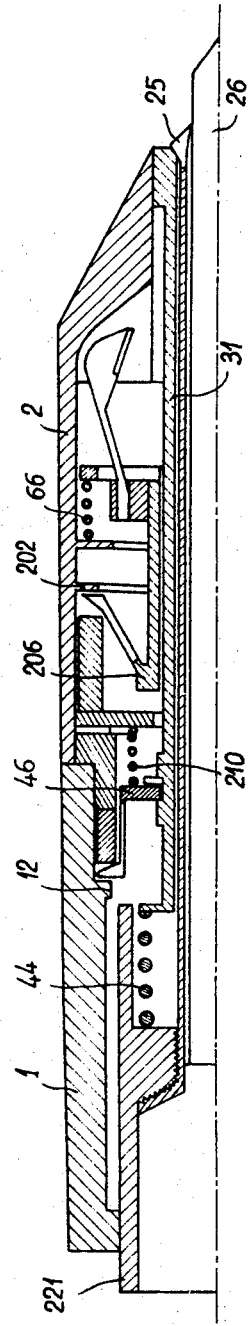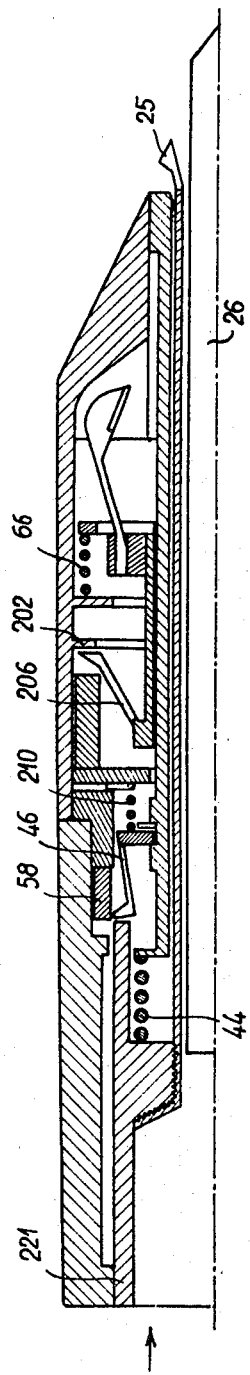

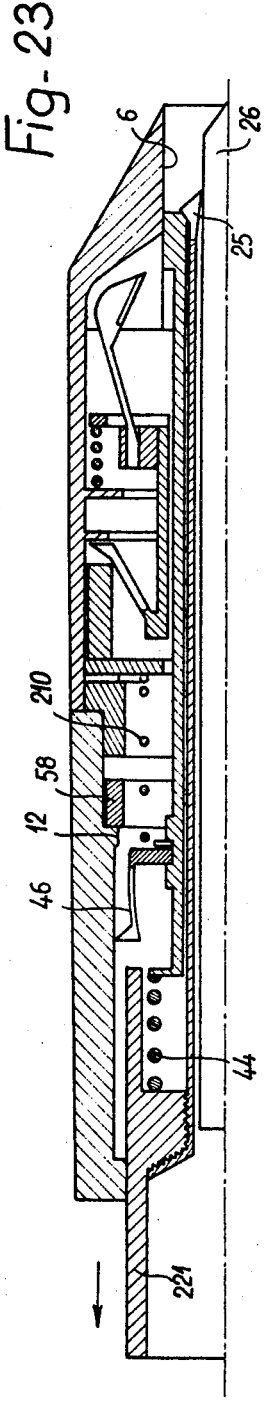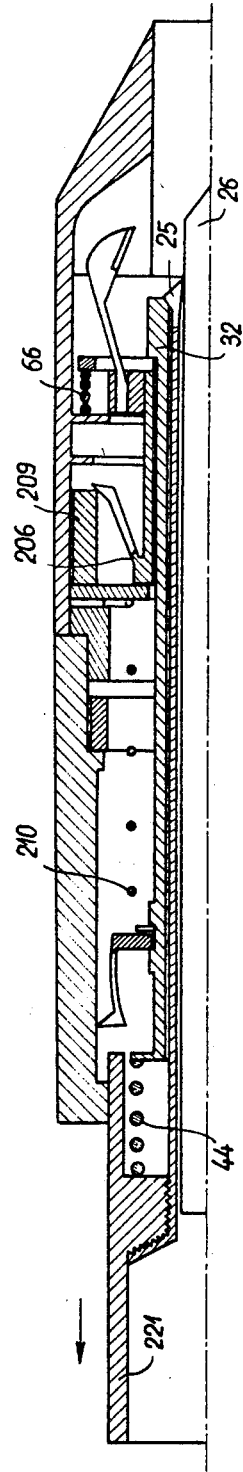

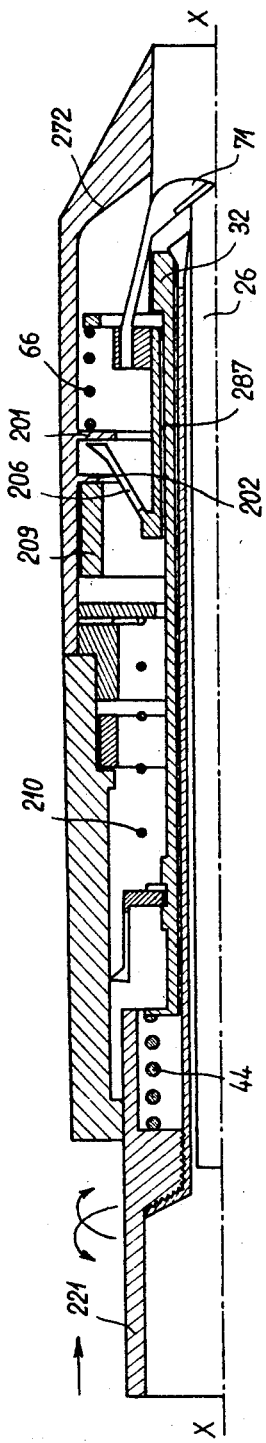

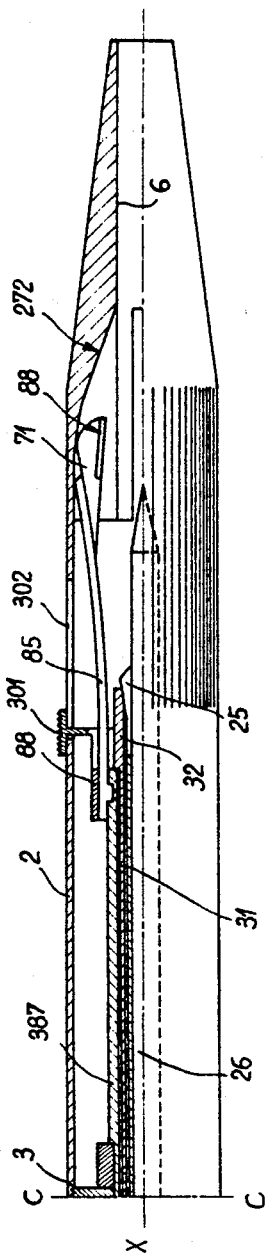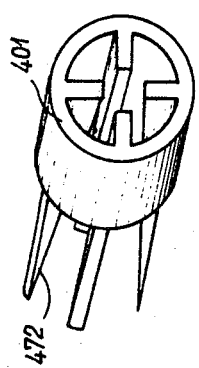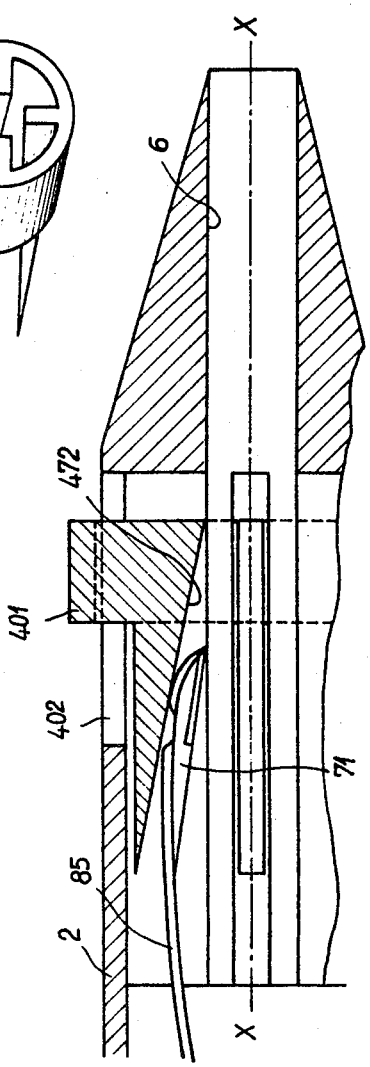

United States Patent Office 3,399,945
Patented Sept. 3, 1968

3,399,945
PROPELLING PENCIL WITH AN INCORPORATED SHARPENING DEVICE
Jacques M. Gouget, 3 Rue d'Auteuil, Paris, France
Filed July 28, 1966, Ser. No. 568,619
Claims priority, application France, Aug. 4, 1965, 27,149; June 25, 1966, 66,945
13 Claims. (Cl. 401—50)

ABSTRACT OF THE DISCLOSURE

A pencil having retractable and extendable lead in a body and a sharpener in the body which can be selectively engaged with the point of the lead to sharpen the same.

The conventional propelling pencil has the disadvantage that, in order to re-sharpen the lead, it must be subjected to the action of the movable sharpening devices, and this action must be carried out with care, since any contact between the propelling pencil and a sharp edge of the said device would have adverse effects on both.

In order to overcome this drawback, it has already been proposed to incorporatet in the propelling pencil a device for sharpening the lead. The sharpening device must of course be withdrawn when it is not used, so that then it only leaves the lead for drawing or use of the propelling pencil. This device then has the corresponding drawback either of yielding elastically under the pressure of the lead during the course of sharpening and of working badly or not at all, or else it is bulky and awkward to handle.

In these propelling pencils, the drawing extremity of the lead is set at a distance from the gripping jaws, which remain wholly inside the body of the pencil and cannot pass through the sharpening device. A not-negligible portion of the lead remains in the propelling pencil and cannot be used right up to the end, and this results in an appreciable loss. These disadvantages have prevented these models from being successfully commercialized.

In consequence, the present invention has for its object a propelling pencil with an incorporated sharpening device, in which the pressure of the lead during sharpening is prevented from reducing the effectiveness of the sharpening tools. More precisely, the invention has for its object a propelling pencil with an incorporated sharpening device, in which the sharpening tools are brought into the working position by a positive and rigid (non-elastic) control, in a manner absolutely independent of the pressure on the lead to be sharpened.

The invention has also for its object to bring out automatically by gravity the used lead from the jaws by a sufficient length, just before sharpening, so that it can be reached by the sharpened tools and that afterwards it is of a length which can be used for drawing.

The invention has furthermore for its object a pencil of the above kind in which it is possible to bring-out or retract the lead by a pre-determined length, while the outlet orifice of the lead in the jaws of the lead guide-tube and the casing remains closed, even in the retractive position of the lead, for putting the pencil in the pocket, so as, on the one hand, to protect the interior of the pencil against dust coming from the exterior, and on the other hand to protect the pocket of the user (or the handbag of a lady user) against the lead dust produced by sharpening.

In more detail, the invention has for its object a pencil of conventional appearance and in which all operations can be effected, including sharpening, by means of its internal mechanism by acting simply with the thumb on the ocnventional push-rod, while the pencil is held in the other four fingers of the same hand. However, in certain simpler forms of embodiment of the invention, a supplementary push-button is employed for sharpening, which permits the lead to be used to the maximum extent, that is to say level with the jaws in which it is held.

Briefly, the pencil according to the invention comprises a body of conventional external appearance, of generally cylindrical shape with a conical point, having a conventional push-button on the extremity opposite to the point; in the body at the point end, are housed sharpening tools which are normally held away from the general axis, except during sharpening, but which for sharpening slide on sloping faces so as to form as they come together a solid cone, coaxial with the pencil, supported on the said sloping faces, and in consequence they do not in any case yield under any pressure on the lead, even strong; the push-button is fixed on a lead guide-tube containing and holding the lead; in the body and around the lead-guide, a sliding casing is provided with the mechanical connections necessary to position the lead and to cause each member to carry out the operation or operations necessary for the actuation controlled by the push-button.

The invention will be described with reference to the accompanying drawings, given by way of example and without implied limitation. In these drawings, FIG. 1 is a general side view of a pencil according to the invention;

FIGS. 8 to 13 are diagrammatic axial sections of the pencil shown in FIGS. 1 to 4, the scale adopted for the diameters being greater than the scale adopted for the axial direction so as to show clearly the positions of the parts for:

Figure 1:
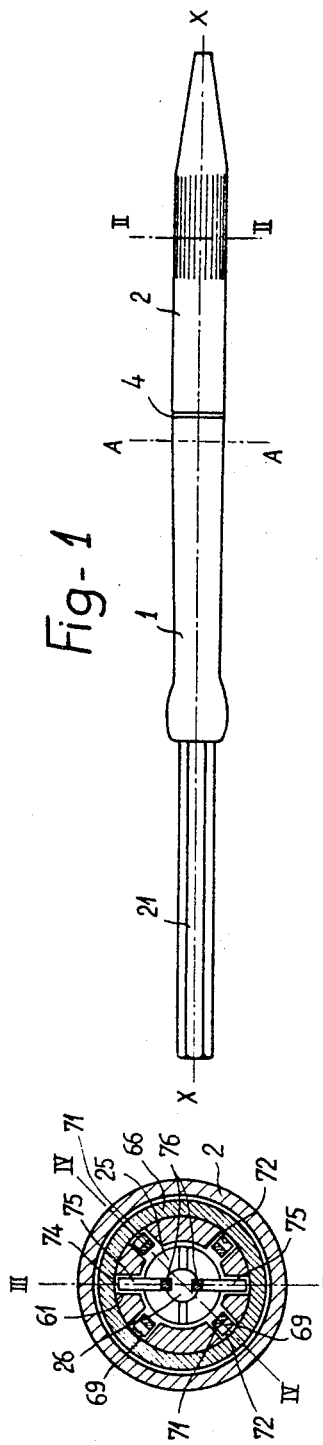
Figure 2:
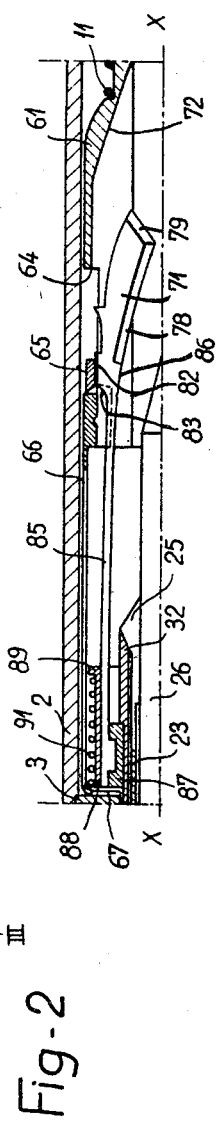
FIG. 2 is a transverse section taken along the line II—II of FIG. 1.
Figure 4:
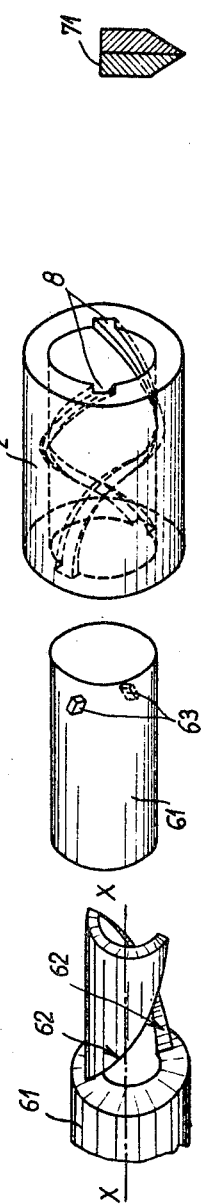
FIG. 4 is a detail in axial section taken along the line IV—IV of FIG. 2.

The drawing position shown in FIG. 8;
The advanced position of the lead shown in FIG. 9;
The retracted position shown in FIG. 10;
A preparatory position shown in FIG. 11;
A further preparatory position shown in FIG. 12;
The sharpening position, shown in FIG. 13.

FIG. 14 is a general side view of another pencil in accordance with the invention;

FIG. 15 is a transverse section taken along the line XV—XV of FIG. 14;

FIG. 16 is an axial section following the line XVI—XVI of FIG. 15, this figure being drawn in two parts separated by a line B—B and to be joined together as indicated in FIG. 14;

FIG. 17 is an axial section, similar to FIG. 16, but showing the parts in the position for sharpening;

FIG. 18 is a general side view of another pencil according to the invention;

FIG. 19 is a transverse section taken along the line XIX—XIX of FIG. 18;

FIG. 20 is an axial section taken along the line XX—XX of FIG. 19, this figure being drawn in two parts separated by a line C—C and to be coupled together in accordance with FIG. 18;

FIGS. 21 to 25 are axial diagrammatic sections of the pencil shown in FIGS. 18 to 20, the scale adopted for the diameters being larger than the scale adopted for the axial direction, in order to show clearly the positions of the parts for:

The drawing position, shown in FIG. 21;
The advanced position of the lead, shown in FIG. 22;
The retracted position, shown in FIG. 23;
A preparatory position, shown in FIG. 24;
The sharpening position, shown in FIG. 25.

FIG. 26, similar to the lower part of FIG. 20, shows a manual control of the position of the sharpening tools;
FIG. 27 is a detail in axial section showing another manual control of the position of the sharpening tools, this control being shown in perspective in FIG. 28.

A pencil according to the invention will now be described with reference to FIGS. 1 to 4. This pencil comprises a sharpening device, brought into position and actuated automatically by the sole operation of its push-button. The main parts of this pencil are a cylindrical body with a conical point, in this body at the point end, a sharpening device adapted to slide helicoidally so as to rotate the sharpening tools, in the body a push-button fixed to a lead-guide tube, and around the lead-guide a casing provided with the necessary mechanical couplings so as to cause each member to carry out the movement or movements corresponding to the operation controlled by the push-button.

The body of the pencil, of generally cylindrical shape with a conical point, is for example, as shown, in two parts 1 and 2 of generally tubular form assembled together for example y driving forcibly over a sleeve 3. This driving fit employs partial fillets and grooves, as shown, so as to lock the parts 1 and 2, axially and in rotation. A decorative ring 4 forms a spacer. The part 2 of the body terminates in a frusto-conical point, in which a precise axial bore 6 is formed. In this point is arranged a partial cylindrical recess 7 giving rise to two helicoidal and diametrically opposite sloping faces 8. A cylindrical groove 9 houses a coil spring 11. In the portion 1 of the body, two rings 12 and 13 are fixed for example with a force fit 3. After the ring 13, a coil spring 14 is housed in the body 1, in the space defined by a shoulder 15. After the shoulder 15 follows a cylindrical portion, a sloping face 16, a groove and a shoulder 17. The body 1 is terminated by an orifice 19, in which a push-button 21 slides with light friction but without being able to rotate. This orifice and the exterior of the push-button may be for example polygonal.

The push-button 21 is internally cylindrical, with an internal collar 22 on which is fixed the lead-guide tube 23 which is forced on or screwed and inset. The lead-guide tube 23 is terminated at the right-hand side by a gripping holder 25 which receives the lead 26. This holder 25 has for example four elastic arms which in the absence of force (see below) open and release the lead 26. The holder is preferably constituted by an extension of the lead-guide tube 23, swaged or thickened, ground and split.

In the body 1–2 and around the lead-guide 23 is housed a casing 31 which is a thin cylindrical tube. Its right-hand extremity comprises a cylindrical collar 32 which can slide with a minimum clearance inside the bore 6 of the body 2. This collar 32 is preferably produced by swaging, by thickening or by a galvanic deposit and ground. Inside the collar 32, the casing 31 is slightly flared, along a slope 33 so as to give a good contact with the holder 25 of the lead-guide 23. The other extremity of the casing 31 terminates in a small collar 35 on which acts a pre-compressed coil spring 36, for example made of square wire as shown, supported against the sleeve 3.

On the left-hand flank of the collar 35 is applied the internal flanged edge 41 of a socket 42 by the action of a pre-compressed coil spring 44 and supported inside the push-button 21. The other end of the socket 42 carries a grip holder 46, for example with four elastic arms 47 tending to open, and provided on their backs, with sloping faces 48 and shoulders 49 as shown. In the body 1, on the right of the sloping face 16, slides a socket 51 provided with a collet 52 engaged between the shoulder 15 of the body 1 and the spring 14 already described.

To the right of the socket 51, a ring 55 slides in the body 1, the straight edge of the ring being internally chamfered at 56. The internal diameter of the ring 55 is slightly less than the internal diameters of the socket 51 and the fixed ring 12 between which it is mounted. Between the ring 12 and the sleeve 3 slides a socket 58, the internal diameter of which is smaller than that of the ring 12.

Figure 6:
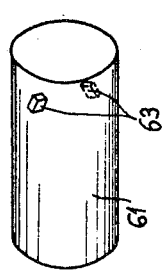
FIG. 6 is a detail in exploded perspective of other helicoidal surfaces for the pencil according to FIG. 1.
Figure 5:
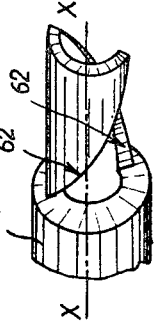
FIG. 5 is a detail in perspective of the helicoidal sloping faces of the pencil according to FIG. 1.
Figure 3:
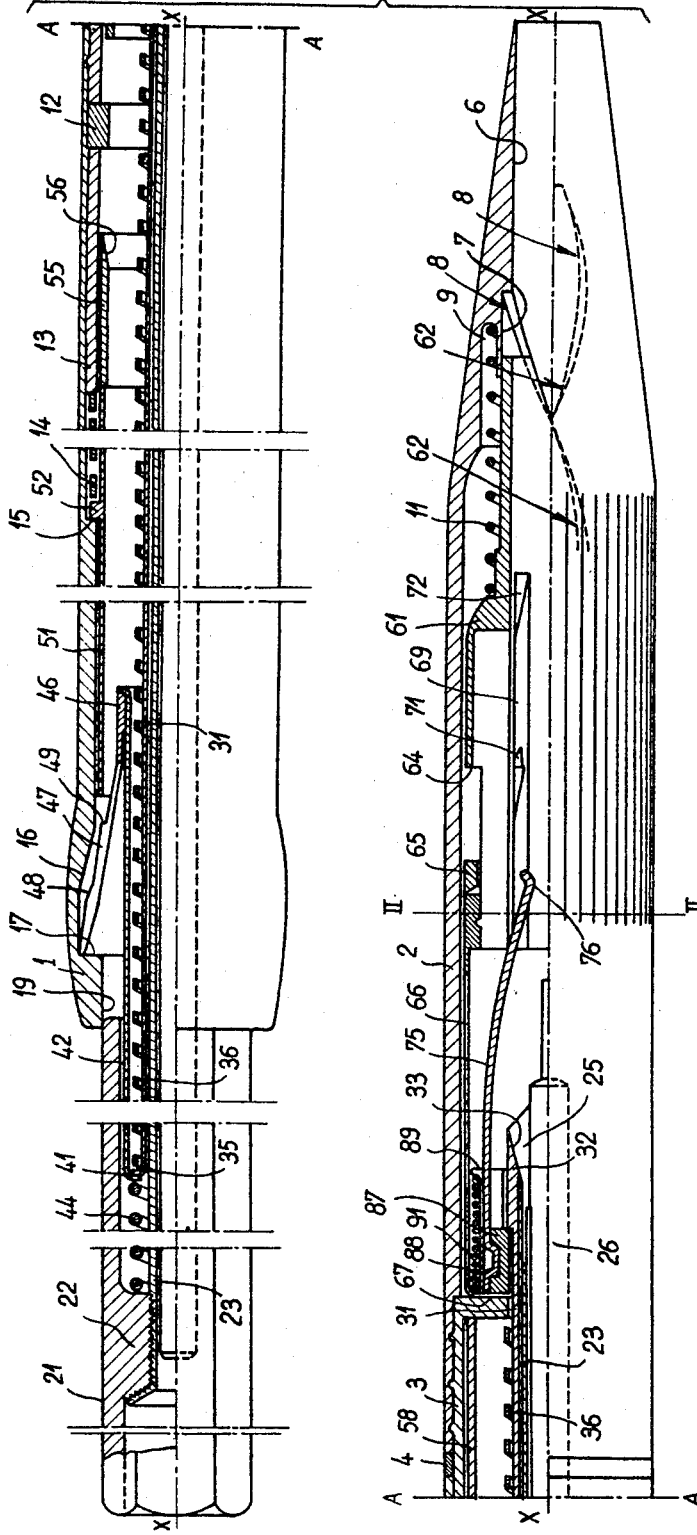
FIG. 3 is an axial section taken along the line III—III of FIG. 2, this figure being drawn in two parts separated by a line A—A to be joined together.

In the portion 2 of the body of the pencil is housed a device for sharpening the lead 26. This device comprises a sharpener 61 with an end-piece sliding in the cylindrical recess 7 and on which acts the spring 11 already described, the body of the sharpener sliding in the portion 2. The sharpener is provided with skewed faces 62 (FIG. 5) co-operating with the skews 8 of the body 2 and converting to helicoidal movement any longitudinal movement given to the sharpener 61. The same result can be obtained, as shown in FIG. 6 by providing the sharpener 61 with two nipples 63 sliding in helicoidal grooves 8 in the body 2.

The sharpener is provided with a shoulder 64 and then has a cylindrical portion on which a ring 65 slides freely, and on the extremity of which a socket 66 is driven by force, with a positioning bead. This socket 66 forms a cage extending the sharpener, and terminates in an internal neck 67. For the purposes of assembly, this socket 66 is made of elastic material with, for example, four longitudinal slits. The sharpener 61 is bored along its axis so as to permit sliding with easy friction of the collet 32 of the casing 31.

The sharpener 61 is provided radially with, for example, four equi-distant notches 69 having a width just sufficient to permit a tool 71 to slide in each, the tool being thus guided laterally. These notches 69 are open towards the longitudinal axis X—X, and closed peripherally by sliding faces 72 which guide the tools 71, as will be described later. The sharpener 61 is further provided, for example, with two other radial notches 74 for the passage of two stop blades 75. These stop blades are flexible and their curved-back extremities 76 are spaced apart slightly less than the diameter of the lead 26.

Figure 7:
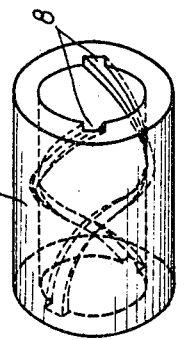
FIG. 7 is a detail in cross-section of tools for the pencil according to FIG. 1.

The tools 71 are preferably of tempered steel. They may be in a single piece or in two opposite blades back to back (FIG. 7) with a symmetrical bevelled cutting-edge 78, the dihedron of which is for example about 85°. This cutting edge is followed by a point 79, bevelled at 90° (if the tools are four in number), the edge of this bevel being raised in such manner that when the four tools 71 are brought together for the sharpening operation (described later), the four edges 79 come together along the axis X—X, and the four tools form a solid cone with an axis X—X when they are brought together. On the side opposite to the cutting edge, the back of each tool 71 has a convex rounded portion 81 which permits it to be guided by the skews 72 of the sharpener 61, and then a straight portion terminating in a shoulder 82 followed by a sloping face 83. The tools 71 are held by elastic arms 85, preferably having a width equal to the thickness of the tools 71, which apply the rounded portions 81 under the faces 72. These arms 85 are longer than the stop blades 75 so that there is a space between the tools 71 and the extremities 76 of the blades 75.

In the event of there being no lead beyond the holder, the symmetrical bevelled cutting edges 72 of the tools 71 cannot be reached by the jaws of the holder 25, since in fact these jaws previously come into abutment against the zones 86 provided for that purpose and not bevelled.

The elastic arms 85 of the tools 71 and the stop blades 75 are fixed on a tubular tool-carrier 87, for example as shown, by means of a ring 88. The tool-carrier 87 slides axially about the casing 31, but its axial bore is too small to allow the passage of the collet 32 of the casing 31. The tool-carrier 87 is provided on the right-hand side with a ring 89, slotted for the free passage of the arms 85 and the blades 75, on which acts a spring 91 supported against the neck 67 of the socket 66.

With regard to the springs described above and their respective strengths, it should be stated that the spring 14 (between the body 1 and the socket 51) is stronger than the spring 44 (between the push-button 21 and the socket 42), spring 44 is stronger than the spring 36 (between the small collar 35 of the casing 31 and the sleeve 3), and spring 36 is stronger than the spring 91 (between the neck 67 of the socket 66 and the ring 89 of the tool-carrier 87). The force of the spring 11 of the sharpening device 61 will be specified later.

The spring 91 is designed so as to have the strength necessary to advance the tools 71 towards the right, in spite of the sloping faces 72.

There will now be described the operation of the pencil shown in FIGS. 1 to 4 and described above, by referring to FIGS. 8 to 13, which are diagrammatic drawings in the sense that, in order to show clearly the complete parts without giving them prohibitive axial lengths, the scale of the diameters has been taken at about 2.7 times the scale along the axis X—X. For this reason, the slopes of the oblique parts and the curvatures are exaggerated, and if it is necessary to examine a sliding movement or a locking action, reference should be made to FIGS. 1 to 4.

FIG. 8 shows the pencil in the drawing or position of use. The spring 36 is compressed and holds the grip 46 in abutment against the ring 12 of the body 1, and, through the intermediary of the casing 31, puts the collet 32 into the bore 6 of the body 2. The compressed spring 44 holds the grip 25 closed by means of the lead-guide 23 and the skewed face 33 of the casing 31, on the lead 26. The lead is thus held in the extended position in an invariable manner, irrespective of the force employed in writing. It will be noted that in this writing position, the grip 25 is at the end of the bore 6 of the body 2, and thereby the lead 26 can be used right down to the level of the grip. This is an important advantage of the invention.

FIG. 9 shows the forward or freed position of the lead. The user pushes the button 21 fully down; this first compresses the sprting 36 which is weaker than the spring 34; the grip 46 is elastically retracted into the socket 58 and comes into abutment against the sleeve 3. In this movement, the collet 32 of the casing 31 moves forward in the bore 6 of the body 2 but remains engaged in this bore. The spring 44 is then compressed; the lead guide 23 moves towards the right, freeing the jaws 25 which open elastically. The lead 26 is free and can be moved forward by hand or by gravity by tilting the pencil.

FIG. 10 shows the retracted position of the lead (in order to put the pencil in a pocket for example). For this purpose it is only necessary for the user, after having depressed the push-button 21, to let it move-up partly and then depress it slightly again. The first pressure causes, as previously, the grip 46 to withdraw into the socket 58; when the push-button 21 moves back, the grip 46 moves the socket 58 which comes into abutment against the fixed ring 12. However, as the internal diameter of the ring 12 is greater than the internal diameter of the socket 58, as already described, the grip 46 does not engage the ring 12, but passes through it. The grip 46 then comes into contact with the ring 55 which it pushes against the socket 51; at this moment, the grip 46 is withdrawn under the chamfer 56 of the ring 55 and passes through the said ring.

When the user slightly depresses the push-button 21, the grip 46 engages the ring 55 by its sloping face 48, the ring 55 moves back and finally the grip 46 comes into abutment against the socket 51 (FIG. 10). The grip 46 then holds the collet 32 of the casing 31 by the spring 36 in the bottom of the bore 6 in the body 2, and the spring 44 holds the jaws 25 closed on the lead 26 by the lead-guide 23. Thus the lead is held in the retracted position and is at the same time protected inside the bore 6.

It will be noted that the bore 6 remains closed, which protects both the pencil against the entry of dust and the user's pocket against the emptying of lead dust from the pencil.

In order to proceed to sharpen the lead, the user is only required to pull out the push-button 21 fully and then to push it in. This double action initiates an operation which will be described in a number of stages.

In the first place, a slight pressure on the push-button 21 frees the grip 46 from the catch on which it is held (the ring 12 in the drawing position or the socket 51 in the retracted position), after which it is fully brought out from the push-button 21 through the intermediary of the lead-guide 23, the jaws 25, the casing 31, and the socket 42. The grip 46 is brought into abutment against the shoulder 17 of the body 1 (FIG. 11) in this movement; the collet 32 of the casing 31 brings back the tool carrier 87 towards the left, which drives the tools 71, the rounded parts 83 of which pass beyond the sliding ring 65, bringing their shoulders 82 into abutment against this ring.

It will be observed that the lead 26 is wholly to the left of the curved-back extremities 76 of the flexible blades 75 (which are shown in broken lines in FIG. 8, since they are not in the plane of this drawing).

When the user depresses the push-button 21, the grip 46 moves slightly to the right, but its shoulders 49 engage the socket 51, held by the spring 14 which, as already stated, is stronger than the spring 44. The latter is compressed and the lead-guide 23 moves to the right. As the casing 31 is held by the spring 36 against the socket of the grip 46, the movement of the lead-guide 23 opens the jaws 25 and frees the lead 26. If the pencil is held vertical or at least oblique, the lead 26 falls until it makes contact with the curved-back extremities 76 of the flexible blades 75 which stop it (FIG. 12). As the inward movement of the push-button 21 continues, the spring 24 is compressed until its turns touch and the spring 14 is compressed in its turn. The movement of the socket 51 towards the right uncovers the sloping face 16 of the body 1 and this face forces back the arms 47 of the grip 46. The grip 46 is retracted into the socket 51 (which returns to the left under the action of its spring 14), and the spring 44 expands and compresses the spring 36. The jaws 25 re-close on the lead 26; the drawing extremity of the lead 26 being now fixed in the lead-guide 23 and therefore in the push-button 21, moves apart the extremities 76 of the flexible blades 75 and passes through them.

On the other hand, the movement of the casing 31 towards the right has been followed by the tool-carrier 87 under the action of the spring 91. The tools 71 push back the ring 65 towards the right and follow the skewed surfaces 72 of the sharpener 61 so as to be joined together in a cone disposed on axis X—X as already explained (FIG. 10).

As the user continues to depress the push-button 21, the spring 36 is compressed and the lead 26 rests by its extremity on the four cutting edges 78 joined together in a cone. As the tools 71 are retained by the skews 72, it is the sharpener 61 which moves back and compresses the spring 11; as already explained, this movement of the sharpener 61 is made helicoidal by the sliding movement of its skewed faces 62 on the skewed faces 8 of the body 2. The lead 26, held by the jaws 25, the lead-guide 23 and the polygonal push-button 21 cannot rotate; it is therefore sharpened by the rotation of the cutting edges 78 which it pushes back.

It will be noted that the sharpening pressure depends on the strength of the spring 11. The invention provides that the strength of this spring 11 is chosen as a function of the hardness of the leads employed.

The sharpening action may be course comprise several to-and-fro movements of the push-button 21 of small amplitudes, corresponding to the travel of the sharpener 61. The user carries out this operation with one finger, for example above an ash-tray so as to collect the sharpening dust. Then it is only necessary to permit the push-button 21 to move outwards by the effect of the spring 36, which brings the tool-carrier 87 to the left, and to depress the push-button 21, which brings back the lead to the retracted position (FIG. 10).

It is clear to those skilled in the art that the tool-carrier which has just been described in capable of various modifications without departing from the scope of the invention. For example, it is obvious that the springs of rectangular wire, so designed in order to reduce the diameter of the pencil, may be replaced by springs of oval wire or round wire. For example again, it is clear that in this case, the co-operation of the helicoidal ramps of the sharpener and of the body can be replaced by the co-operation of nipples on the sharpening device with the helicoidal grooves or by the inverse arrangement. Again for example, it is clear that the automatic advance of the lead before sharpening can be eliminated, with corresponding simplification.

A pencil thus modified according to the invention will now be described with reference to FIGS. 14 to 17. There are again shown the same main parts, having the same references, and there will only be described the modifications with respect to FIGS. 1 to 4.

In the portion 1 of the body, the spring 14 is eliminated, together with the sloping face 16. The spring 36 is of round wire. The elastic arms 47 of the grip 46 now only comprises one sloping face 48. The moving socket 51 is dispensed with and replaced by a ring 151, forcibly inserted in the body 1, this ring also having an internal diameter slightly larger than the internal diameter of the ring 55. The flexible stop blades 75 are eliminated together with their slots 74 in the sharpener 61. The operation of the pencil shown in FIGS. 14 to 17 generally remains the same as that of the pencil shown in FIGS. 1 to 4; there is of course no longer any automatic advance of the lead before sharpening, as shown in FIGS. 11 and 12.

A further simplification of the pencil according to the invention consists of obtaining rotation of the lead in the tools during sharpening directly by manual rotation of the push-button. The push-button is then externally cylindrical and the moving sharpening device is replaced by an arrangement in the body 2. On the other hand, it has been described how the tools take-up certain positions (see in particular FIGS. 4, 8, 9 and 16); it is possible to ensure this positioning in other ways. These modifications are perhaps less obvious and will be described with reference to FIGS. 18 to 20.

The pencil shown in FIGS. 18 to 20 comprises, for the major part, the main components of the pencil shown in FIGS. 1 to 4, and only the modifications will be described. In the body 2, the recess 7 and the skewed surfaces are eliminated, together with the groove 9 and the spring 11. It is in the body 2 that the slots are formed by which the skewed surfaces 272 guide the tools 71. The body 2 further receives two split rings 201 and 202 housed in circular grooves and forming abutments. In the body 1, the ring 13, the spring 14, the shoulder 15 and the sloping face 16 are eliminated; the orifice 219 of the body 1 is cylindrical, as is also the push-button 221.

The casing 31 is provided with two rings 203 and 204 inserted by force, or brazed, or stamped, holding between them the grip 46 with elastic arms 47 (without shoulder or skewed face). The socket 51 and the ring 55 are dispensed with. In the body 1, the tool-carrier is extended and takes a tubular form 287. Its right-hand extremity again receives the arms 85 of the tools 71. The spring 66 is mounted between its ring 89 and the ring 201; its left-hand extremity is rigidly fixed to a grip 206 with elastic arms 207 which can co-operate with a socket 209 placed between the sleeve 3 and the abutment 202, and having an internal diameter smaller than the internal diameter of the abutment 202. Between the grip 46 and the sleeve 3 is housed a spring 210, the extremities of which are held by these parts and which works alternately in tension and in compression, as described below.

There will now be described the operation of the pencil shown in FIGS. 18 to 20 by referring to FIGS. 21 to 23, which are diagrammatic illustrations in the sense that there has been adopted for the diameters a scale about four times larger than the scale along the axis X—X; the slopes of the oblique parts are therefore exaggerated.

FIG. 21 shows the pencil in the drawing position. The compressed spring 210 holds the grip 46 in abutment against the ring 12, which positions the casing 31. The compressed spring 44 holds the jaws 25 closed on the lead 26. The compressed spring 66 holds the grip 206 in abutment against the ring 202. The tools 71 are thus retracted and the lead 26 is brought out and rigidly held.

FIG. 22 shows the pencil in the forward position of the lead; the push-button 221 is depressed and this compresses the spring 44 and the spring 210. The jaws 25 free the lead 26 which can move forward for example by gravity by tilting the pencil. On the other hand, the grip 46 is retracted in the ring 58; the spring 66 still holds the tools 71 retracted.

FIG. 23 shows the pencil in the retracted position. The push-button 221 is brought out and the spring 210 is free (neither compressed nor stretched), since the grip 46 has carried away, to the left, the ring 58 which has enabled it to pass through the abutment 12. The spring 44 holds the jaws 25 closed on the lead 26 which is retracted into the bore 6. It will be noted that in this case also the bore 6 is closed.

In order to proceed to sharpen the lead, the user brings out the push-rod 221 fully, and then pushes it in and turns it. In the fully-out position, the push-button 21 compresses the spring 66 by the shoulder 32, and the grip 206 is retracted into the socket 209 (FIG. 24). The spring 44 holds the jaws 25 closed on the lead 26 and the spring 210 is expanded. When the push-button 221 is depressed, the shoulder 33 permits the tool-carrier 287 to return to the right by the action of the spring 66. The grip 206 moves the socket 209 to the right and this permits the grip to pass over the abutment 202. The tools 71 follow the sloping faces 272 and come together to form a cone with an axis coincident with axis X—X (FIG. 25). The extended spring 210 forces the lead 26 against the tools 71 and the sharpening action is obtained by manual rotation of the push-button 221, by pushing it when so required. In this case also, irrespective of the thrust applied by the lead 26 on the tools 71, the latter cannot move away since they are locked against each other in the skewed faces 272.

In order to return to the retracted position, it is only necessary to pull on the push-button 221, which brings the tool-carrier to the left, in which position the grip 206 becomes locked, the push-button being then released.

A further simplification of the pencil according to the invention will now be described with reference to FIG. 26, which replaces the lower part of FIG. 20. The tool-carrier is in this case positioned manually. This involves the elimination of the grip 206, the ring 209, the abutments 202 and 201 and the spring 66. The tool-carrier 387 is provided with a positioning button 301 passing out of the body 2 and sliding in a slot or elongated window 302.

In an alternative form shown in FIG. 27, the tools 71 held in a fixed position by their elastic arms, are brought into the sharpening position by a ring 401 carrying the skewed faces 472 and sliding in grooves 402 in the body 2 by manual actuation. The FIG. 28 shows ring 401 in perspective.

What I claim is:
1. A pencil comprising a body of generally cylindrical shape and a conical point with the same axis, an axial push-button sliding in said body on the side opposite to said point, sharpening tools in said body at the side of said point, elastic arms holding said tools away from said axis, sloping faces slidably engaged by said tools which, for sharpening, form when brought together a solid cone coaxial with said axis and rigidly held by said sloping faces, a tubular lead-guide fixed to said push-button, a lead received by said lead-guide, elastic jaws terminating said lead-guide at the extremity of said point, a tubular casing in said body around said lead-guide, a collar terminating said casing at the end opposite to the point, a first spring pushing said collar towards said push-button, an internal flared portion terminating said casing at the point extremity and clamping said jaws on said lead close to the drawing extremity of this latter by the action of said spring, and mechanical positioning couplings.

2. A pencil as claimed in claim 1, comprising around said casing a first coaxial socket, a second spring pushing said socket which pushes said casing towards said point and being supported on said push-button, said second spring being stronger than said first spring, a positioning grip rigidly fixed to said socket, elastic arms fixed on said grip, a shoulder and an internal sloping face of the body co-operating with said arms, a second socket sliding in said body and co-operating with said arms, a third spring stronger than said second spring and pushing said second socket towards said push-button, a first abutment in said body, a third socket sliding in said body between said second socket and said first abutment and co-operating with said arms, a second abutment in the body, a fourth socket sliding in said body between said first and second abutments.

3. A pencil as claimed in claim 1, comprising round said casing a first coaxial socket, a second spring pushing said socket which pushes said casing towards said point and being supported on said point, said second spring being stronger than said first spring, a first positioning grip fixed to said socket, elastic arms fixed on said grip, an internal shoulder of the body co-operating with said arms, a first and a second abutments in said body, a second socket sliding in said body between said first and second abutments and co-operating with said arms, a third abutment in said body, a third socket sliding in said body between said second and third abutments and adapted to co-operate with said arms.

4. A pencil as claimed in claim 1, comprising a tool-carrier sliding in said body around said casing, a shoulder formed on said casing at its point extremity retaining said tool-carrier on said casing, a fourth spring pushing said tool-carrier towards said point and weaker than said first spring, a sharpening device in said body close to said point, skewed faces formed in said body and co-operating with said sharpening device, radial slots formed in said sharpening device, said tool sliding in said radial slots, the peripheral bottoms of said slots constituting said sliding faces for said tools, a hole formed in said body at the end opposite to said point, said push-button being slidable without rotation in said hole, for example polygonal.

5. A pencil as claimed in claim 4, comprising a ring slidably mounted on said sharpening device, a fifth socket mounted on said sharpening device and forming a cage round said sharpening device and said fourth spring, a shoulder on the back of said tools co-operating with said ring.

6. A pencil as claimed in claim 4, comprising two skewed surfaces formed on said sharpening device and co-operating with said skewed surfaces of said body.

7. A pencil as claimed in claim 4, and further comprising two nipples fixed on said sharpening device and sliding in said skewed faces of said body.

8. A pencil as claimed in claim 4, and further comprising two flexible blades held by said tool-carrier, two second radial slots formed in said sharpening device and into which pass said flexible blades, the extremities of said blades being curved back and separated by a space smaller than a diameter of said lead.

9. A pencil as claimed in claim 1, and further comprising two abutments fixed on said casing, a positioning grip rotating on said casing between said abutments, elastic arms rigidly fixed to said grip, an internal shoulder and an internal abutment of said body co-operating with said arm, a second internal abutment of said body, a socket sliding in said body between said first and second abutments and co-operating with said arms, a second spring supported on said push-button and pushing said casing towards said point, a third spring having one extremity fixed to said casing and the other to said body, and a cylindrical hole formed in said body in the part opposite to said point, said push-button being externally cylindrical 10. A pencil as claimed in claim 9, and further comprising a tool-carrier sliding in said body round said casing, a shoulder formed on said casing at its point extremity and retaining said tool-carrier on said casing, a third abutment of said body, a fourth spring supported on said third abutment and pushing said tool-carrier, a second positioning grip fixed to said tool-carrier, elastic arms fixed to said second grip, a fourth abutment of said body, said third and fourth abutments co-operating with the arms of said second grip, radial slots formed in said point of said body, the bottoms of said slots constituting said sloping guide surfaces for said tools.

11. A pencil as claimed in claim 9, and further comprising a tool-carrier sliding in said body about said casing, a shoulder formed on said casing at its point extremity and retaining said tool-carrier on said casing, a window formed in said body, a push-button external and fixed to said tool-carrier and sliding in said window, radial slots formed in said point of said body, the bottoms of said slots constituting the sloping guide-surfaces of said tools.

12. A pencil as claimed in claim 9, in which said elastic arms of said tools are rigidly fixed to said body, and comprising a second socket sliding in the point of said body, radial slots formed in said socket, the bottoms of said slots constituting said sloping guide-faces for said tools, a window in said body, an external push-button fixed to said socket and sliding in said window.

13. A pencil as claimed in claim 12, in which said tools are constituted by two leaves fixed together back to back.

References Cited

UNITED STATES PATENTS

| | | | |
|---|---|---|---|
| 1,719,976 | 7/1929 | Grimmer | 401—51 |
| 2,158,439 | 5/1939 | Sonne | 401—51 |
| 2,198,384 | 4/1940 | Purgstall | 401—51 |

FOREIGN PATENTS

| | | |
|---|---|---|
| 679,264 | 9/1952 | Great Britain. |
| 302,058 | 9/1954 | Switzerland. |

LAWRENCE CHARLES, *Primary Examiner.*